United States Patent
Frey

(10) Patent No.: US 9,366,022 B2
(45) Date of Patent: Jun. 14, 2016

(54) IN-LINE FRAME CONNECTOR ASSEMBLY AND SYSTEM FOR LARGE PORTABLE FRAMEWORKS

(71) Applicant: MOSS HOLDING COMPANY, Elk Grove Village, IL (US)

(72) Inventor: Robert M. Frey, Salt Lake City, UT (US)

(73) Assignee: Moss Holding Company, Elk Grove Village, IL (US)

( * ) Notice: Subject to any disclaimer, the term of this patent is extended or adjusted under 35 U.S.C. 154(b) by 0 days.

(21) Appl. No.: 14/459,233

(22) Filed: Aug. 13, 2014

(65) Prior Publication Data

US 2015/0047283 A1    Feb. 19, 2015

Related U.S. Application Data

(60) Provisional application No. 61/865,512, filed on Aug. 13, 2013.

(51) Int. Cl.
| | | |
|---|---|---|
| *E04C 1/00* | (2006.01) | |
| *E04B 1/58* | (2006.01) | |
| *F16B 7/18* | (2006.01) | |
| *F16B 35/00* | (2006.01) | |
| *E04B 1/19* | (2006.01) | |

(Continued)

(52) U.S. Cl.
CPC .............. *E04B 1/5831* (2013.01); *F16B 7/182* (2013.01); *F16B 35/005* (2013.01); *E04B 2001/1957* (2013.01); *E04B 2001/5856* (2013.01); *E04C 2003/043* (2013.01); *E04C 2003/0465* (2013.01); *F16B 5/0266* (2013.01)

(58) Field of Classification Search
CPC .......... E04B 1/5831; E04B 2001/1957; E04B 2001/5856; E04C 2003/043; E04C 2003/0456; F16B 5/0266; F16B 7/182; F16B 35/005
USPC ................ 52/235, 309.1, 653.1, 653.2, 655.1
See application file for complete search history.

(56) References Cited

U.S. PATENT DOCUMENTS

| | | |
|---|---|---|
| 2,192,048 A | 2/1940 | Mueller |
| 2,290,430 A | 7/1942 | Heiser |
| 2,850,304 A | 9/1958 | Wagner |

(Continued)

FOREIGN PATENT DOCUMENTS

| | | |
|---|---|---|
| EP | 0226654 A1 | 7/1987 |
| EP | 0327506 A1 | 8/1989 |

*Primary Examiner* — James Buckle, Jr.
(74) *Attorney, Agent, or Firm* — Lance M. Pritikin, Esq.

(57) ABSTRACT

A frame connector assembly is adapted to releasably secure first and second frame members in line with one another. The connector assembly includes first and second expansion elements elastically interconnected. The second expansion element includes two hollow lobes joined by a web. When the connector assembly is received by the two frame members, threaded rotation of one or more threaded actuators forces the expansion elements apart and into engagement with opposing primary walls of the frame members. The threaded actuator also presses against the web, thereby causing resilient outward rotation of the lobes. This rotation results in compressive engagement between the outboard edges of the second expansion element and respective intermediate walls of the frame members. Thus, the connector assembly imposes locking forces to the frame members along two axes orthogonal to the main axis of the frame connector assembly. The expansion elements may have an identical extrusion cross-section.

20 Claims, 3 Drawing Sheets

(51) Int. Cl.
    *E04C 3/04*         (2006.01)
    *F16B 5/02*        (2006.01)

(56) References Cited

U.S. PATENT DOCUMENTS

| | | | |
|---|---|---|---|
| 2,952,484 A | 9/1960 | Zoltok | |
| 2,976,970 A * | 3/1961 | Toney | 52/235 |
| 2,997,317 A | 8/1961 | Scott | |
| 3,437,362 A | 4/1969 | Offenbroich | |
| 3,484,830 A * | 12/1969 | Wagner et al. | 285/397 |
| 3,514,135 A | 5/1970 | Cooper | |
| 3,547,475 A | 12/1970 | Gingher | |
| 3,572,778 A | 3/1971 | Cassel | |
| 3,606,408 A | 9/1971 | Wagner | |
| 3,701,553 A | 10/1972 | Voht | |
| 4,174,911 A | 11/1979 | Maccario et al. | |
| 4,249,830 A | 2/1981 | Day | |
| 4,344,719 A | 8/1982 | Thom | |
| 4,448,003 A | 5/1984 | Hasbrouck | |
| 4,570,408 A | 2/1986 | Frascaroli et al. | |
| 4,657,426 A | 4/1987 | Targetti | |
| 4,718,789 A | 1/1988 | Kuenen | |
| 5,083,882 A | 1/1992 | Liu | |
| 5,203,135 A | 4/1993 | Bastian | |
| 5,605,410 A | 2/1997 | Pantev | |
| 5,642,957 A | 7/1997 | Lange | |
| 5,893,675 A | 4/1999 | Lange | |
| 5,904,437 A | 5/1999 | Allen | |
| 6,106,183 A | 8/2000 | Strassle et al. | |
| 6,216,413 B1 | 4/2001 | Lapointe | |
| 6,722,810 B1 | 4/2004 | Tachikawa | |
| 6,874,971 B2 | 4/2005 | Albaugh | |
| 7,938,593 B1 | 5/2011 | Young | |
| 8,128,519 B1 * | 3/2012 | Mahoney | 473/478 |
| 8,235,623 B2 | 8/2012 | Wagner et al. | |
| 8,333,531 B1 | 12/2012 | Wei et al. | |
| 8,341,900 B2 * | 1/2013 | Reyal et al. | 52/235 |
| 8,453,402 B2 * | 6/2013 | Huang | 52/235 |
| 2002/0007612 A1 | 1/2002 | Gierss | |
| 2004/0025459 A1 * | 2/2004 | Huebner et al. | 52/282.1 |
| 2011/0001315 A1 | 1/2011 | Fischer et al. | |
| 2011/0277417 A1 * | 11/2011 | Welcel | 52/653.1 |
| 2014/0096469 A1 * | 4/2014 | Fountain | 52/650.3 |

\* cited by examiner

IN-LINE FRAME CONNECTOR ASSEMBLY AND SYSTEM FOR LARGE PORTABLE FRAMEWORKS

RELATED APPLICATIONS

This application claims the benefit of U.S. Provisional Application No. 61/865,512 filed Aug. 13, 2013, the content of which is incorporated by this reference in its entirety for all purposes as if fully set forth herein.

TECHNICAL FIELD

The present invention relates generally to portable display framing systems designed to form large temporary structures, particularly where such framing systems are substantially comprised of extruded metal frame members which are reversibly interconnected.

BACKGROUND

As the popularity of portable display structures has increased, so has the use of such products in larger framing applications. Applications requiring structure sizes from 20 feet wide by 20 feet long by 10 feet high to up to 100 feet in length and 30 feet in height are now more common. Snap frame systems typically have an inherent "looseness" at every joint, and are therefore not appropriate for use in applications requiring high strength.

What is needed is an in line frame connection assembly which is suited for the rapid assembly and disassembly of large, heavy display and event frameworks, provides significant bending-load reinforcement at the linear joint between respective joined frame members, is simple to use, relatively light weight, self-contained (no loose parts) and highly cost effective to manufacture.

SUMMARY

Certain deficiencies of the prior art may be overcome by the provision of one or more embodiments an in-line frame connector assembly and frame connection system for large portable frameworks.

Exemplary embodiments of a frame connector assembly are adapted to releasably secure a first frame member to a second frame member in-line with one another, and may comprise a main axis, first and second expansion elements and one or more actuator elements. The first and second expansion elements are joined to one another in elastically separable ("floating") fashion. The first expansion element may have a first outer face. The second expansion element may have a second outer face disposed oppositely of the first outer face. The second expansion element preferably includes a pair of hollow lobe members each being elongated along a respective lobe axis. The lobe members may be connected to one another by way of a web portion therebetween, which may thereby define a channel disposed inward of the second outer face. Each lobe member may preferably have a respective outboard edge. The expansion elements may be comprised of Aluminum and may preferably have an identical extrusion cross-section.

The one or more actuator elements are preferably mounted in threaded association with the first expansion element Each actuator element may have a tool engagement end and a web engagement end. The tool engagement end is adapted to receive or otherwise engage a torqueing tool and may be accessible through the first outer face. The web engagement end is pressingly associated with the web portion wherein threaded movement of the actuator element in an expansion direction forces the first and second expansion elements apart from one another.

In exemplary embodiments of a system which includes the frame connector assembly discussed herein, the first frame member has a first internal cavity defined by a pair of opposed first primary walls and a pair of opposed first intermediate walls extending therebetween. Similarly, the second frame member has a second internal cavity defined by a pair of opposed second primary walls and a pair of opposed second intermediate walls extending therebetween. The frame connector assembly has a dual-received configuration wherein respective segments (e.g., halves) of the frame connector assembly are simultaneously received within the internal cavities of the frame members and the first outer face is parallel to respective primary walls of the frame members.

When the frame connector assembly is in its dual-received configuration with the frame members, continued threaded movement of the one or more actuator elements in the expansion direction eventually results in compression between the outer walls of the connector assembly and respective primary walls of the frame members, and results in opposing resilient rotation of the lobe members. This opposing resilient rotation results in compressive "gripping" engagement between the outboard edges of the second expansion elements and respective intermediate walls of the frame members. Thus, this frame connector assembly imposes locking forces to the frame members along two axes orthogonal to the main axis of the frame connector assembly. Threaded return of the actuator elements toward their unlocking position relieves the pressing force from the web portion and allows the lobe members to return to their original non-rotated orientations.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
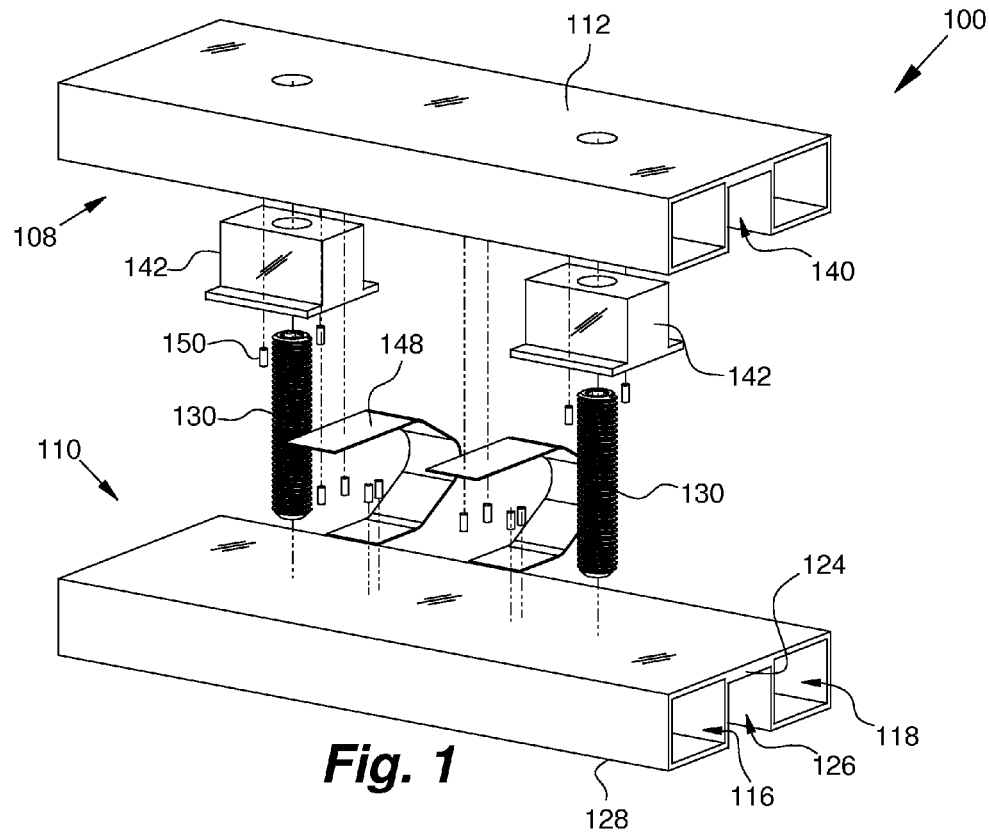
FIG. 1 is a diagrammatic perspective exploded view of one example embodiment of a frame connector assembly in accordance with the present invention.

Referring now to the drawings, like reference numerals designate identical or corresponding features throughout the several views.

Figure 2:
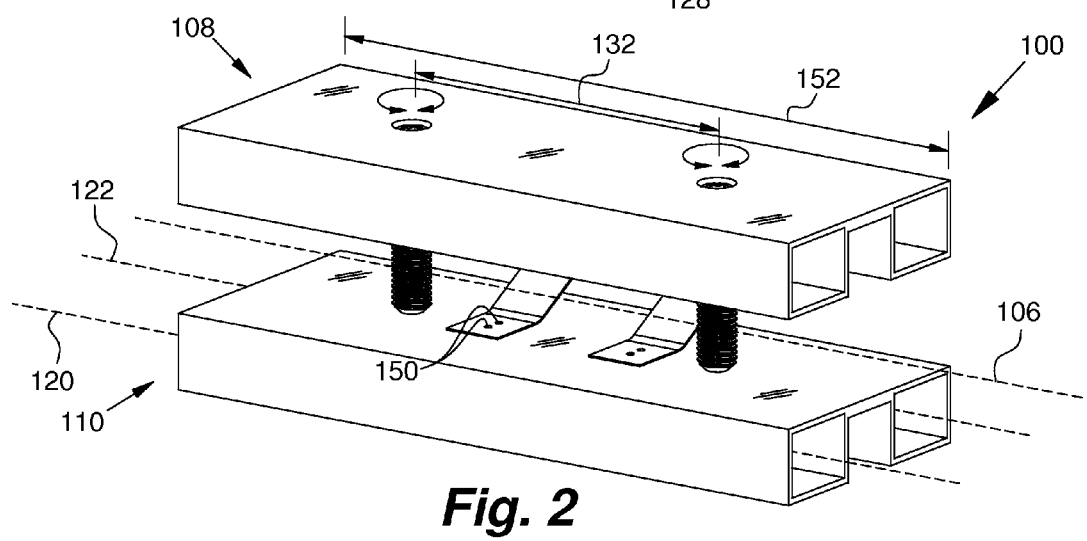
FIG. 2 is a diagrammatic view of the embodiment shown in FIG. 1, but in collapsed form.
Figure 3:
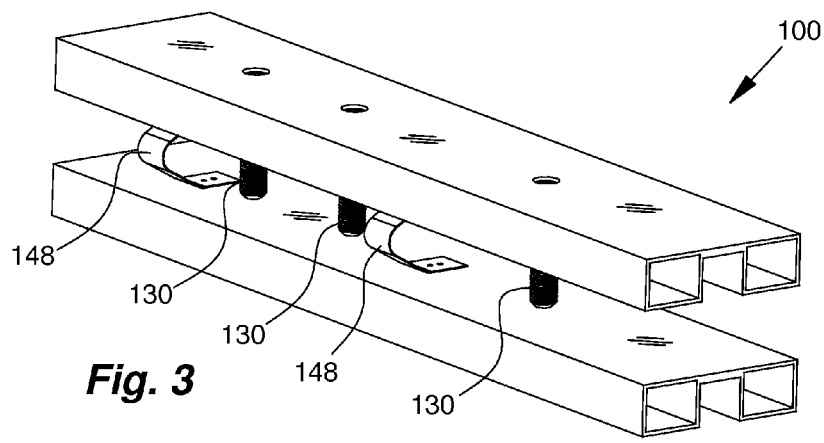
FIG. 3 is a diagrammatic perspective view of a further embodiment of a frame connector assembly in accordance with the present invention, wherein the connector is larger than the embodiment shown in FIG. 2 and includes an additional threaded actuator element.
Figure 6:
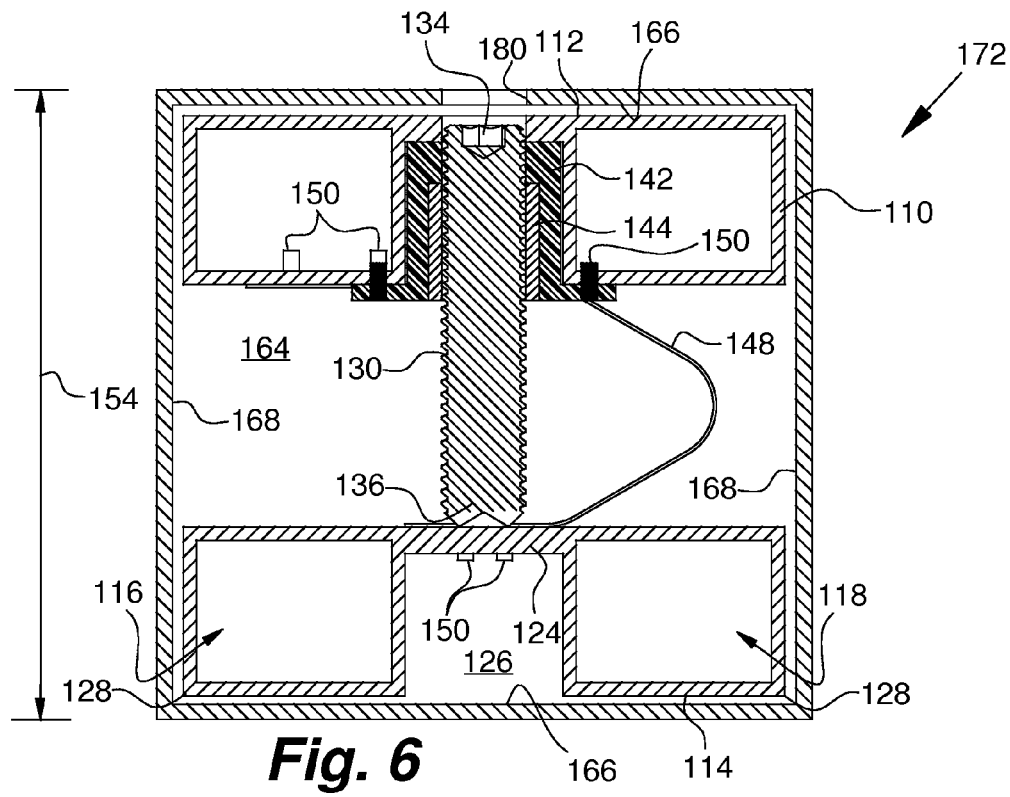
FIG. 6 is a diagrammatic cross-sectional view taken across lines 6-6 in FIG. 5, showing the in-line frame connector in released configuration with respect to the frame member.

Exemplary embodiments of a frame connector assembly for releasably rigidly joining a first frame member and a second frame member in-line with one another at shown generally at 100. Referring to FIGS. 1 and 2 for example, a frame connector assembly 100 may comprise a main axis 106, a first expansion element 108, a second expansion element 110 and one or more actuator elements 130. The first expansion element 108 and second expansion element 110 may be joined to one another laterally of the main axis 106 in elastically separable fashion. The first expansion element 108 may have a first outer face 112. The second expansion element may have a second outer face 114 (see, for example, FIG. 6) disposed oppositely of the first outer face 112. The second expansion element 110 may preferably have a pair of hollow lobe members 116 and 118 each being elongated along a respective lobe axis 120 and 122. The lobe members 116 and 118 may be connected to one another by way of a web portion 124 therebetween, which may thereby define a channel 126 disposed inward of said second outer face. Referring to FIG. 6 for example, each lobe member 116 and 118 may preferably have a respective outboard edge 128.

Figure 7:
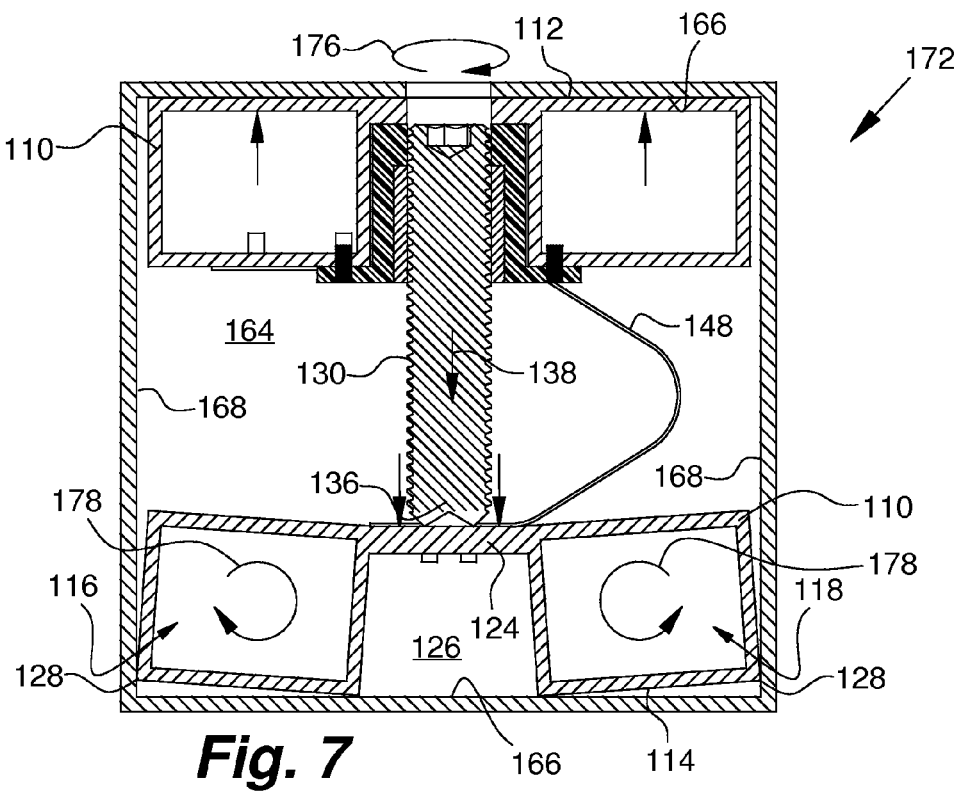
FIG. 7 is a diagrammatic cross-sectional view taken across lines 6-6 in FIG. 5, showing the in-line frame connector in locking configuration with respect to the frame member.

The one or more actuator elements 130 may be mounted in threaded association with the first expansion element 108 and separated by an actuator distance 132 along the main axis 106. Referring to FIG. 6, each actuator element 103 may have a tool engagement end 134 and a web engagement end 136. The tool engagement end 134 is preferably adapted to engage (e.g., receive) a torqueing tool and may be accessible through the respective frame member by way of an access port 180 therethrough. Referring to FIG. 7, the web engagement end 136 may be pressingly associated with the web portion 124 wherein threaded movement of the actuator element (e.g., by way of rotation 176) in an expansion direction 138 toward the second expansion element 110 preferably forces the first and second expansion elements 108 and 110 apart from one another.

Referring to FIG. 1, in particular embodiments, the first expansion element 108 may have a block mounting groove 140 disposed oppositely of the first outer face 112. Referring to FIGS. 1 and 6, in such embodiments, the one or more actuator elements 130 may be mounted in threaded association by way of respective block elements 142 retained within the block mounting groove. Such retention may be provided by way of one or more rivets or screws 150, or the like. Referring to FIG. 6, the block elements 142 may preferably be comprised of a polymer which is molded with a respective female-threaded brass fitting 144 therein.

In certain embodiments, the first and second expansion elements 108 and 110 may be comprised of Aluminum and, as illustrated in FIG. 6 for example, may have an identical extrusion cross-section.

In particular preferred embodiments, the aforementioned elastic separability may be provided by way of one or more spring elements 148. As illustrated throughout the several figures herein, the spring elements 148 may preferably be formed of flat spring steel, and may be riveted or screwed to the expansion elements 108 and 110.

Referring to FIG. 2, in certain embodiments, the actuator distance 132 may be at least 150 mm. Moreover, the frame connector assembly 100 may have a length 152 of least 300 mm. Referring to FIG. 6, in embodiments the first frame member 102 and second frame member 104 may be elongated and may each have a height 154 and width (orthogonal to the height) of 120 mm.

Figure 4:
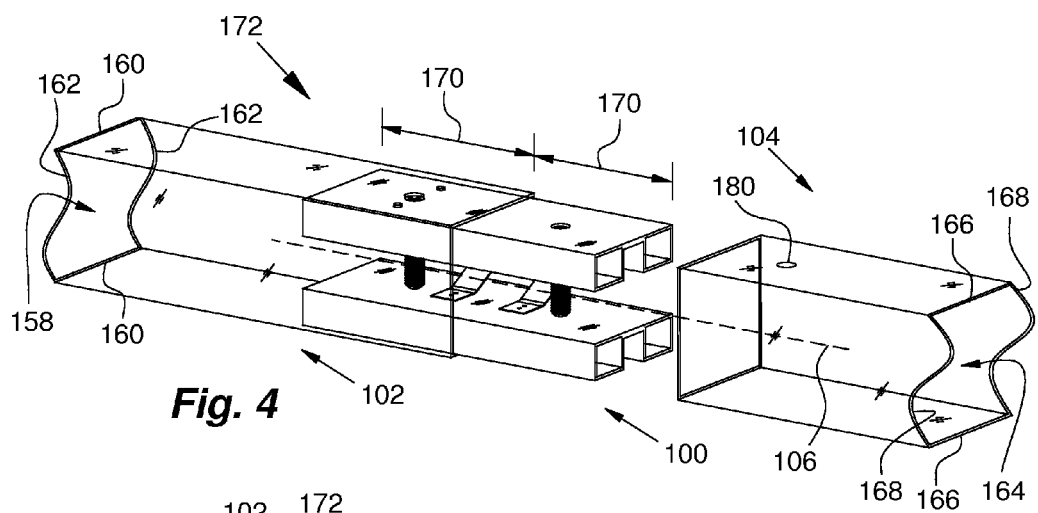
FIG. 4 is a diagrammatic partial perspective view of an in-line frame connection system in accordance with the present invention, showing one segment of the frame connector assembly received within the internal cavity of a first frame member and the other segment ready to be received by the internal cavity of the second frame member.

Referring now to FIG. 4, in particular embodiments, the first frame member 102 has a first internal cavity 158 defined by a pair of opposed first primary walls 160 and a pair of opposed first intermediate walls 162 extending therebetween. Similarly, the second frame member 104 may have a second internal cavity 164 defined by a pair of opposed second primary walls 166 and a pair of opposed second intermediate walls 168 extending therebetween. the frame connector assembly 100 may have a dual-received configuration (see FIG. 5 for example) wherein respective segments 170 of the frame connector assembly 100 are simultaneously slidably received within the internal cavities 158 and 164 and the first outer face 112 is parallel to respective first and second primary walls.

Referring to FIG. 7, in preferred embodiments, when the frame connector assembly 100 is in its dual-received configuration with the frame members, continued threaded movement of the one or more actuator elements 130 in the expansion direction 138 results in compression between the outer walls 112 and 114 and respective primary walls 160 and 166, and opposing resilient rotation 178 of the lobe members 116 and 118 about their respective lobe axes 120 and 122. As illustrated in FIG. 7, the opposing resilient rotation 178 may preferably be configured to result in compressive engagement between the outboard edges 128 and respective intermediate walls (162 or 168). Thus, embodiments of the frame connector assembly 100 are capable of imposing locking forces to the respective frame members along two axes orthogonal to the main axis 106 of the frame connector assembly 100, thus improving the in-line securement of the frame members to one another.

Figure 5:
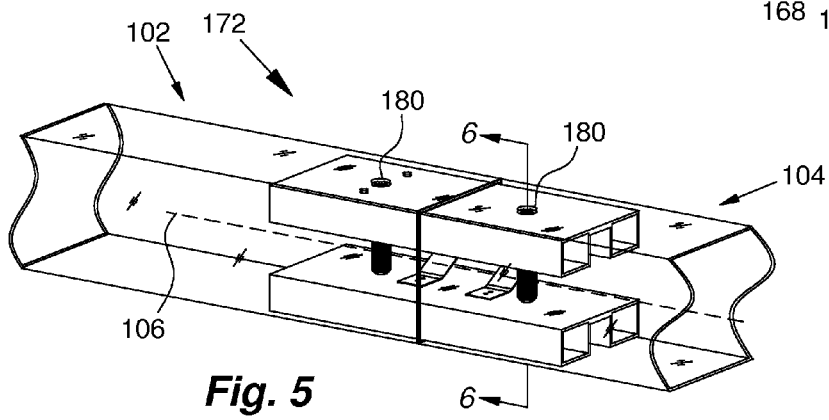
FIG. 5 is a diagrammatic partial perspective view of the an in-line frame connection system of FIG. 4, but showing both segments of the frame connector assembly received within the respective internal cavities of a first and second frame member.

As illustrated for example in FIGS. 4 and 5, embodiments of an in-line frame connection system 172 may be provided in which a frame connector assembly 100 is in releasably rigid joining relationship between a first frame member 102 and a second frame member 104. In such embodiments, respective segments 170 of the frame connector assembly 100 may be simultaneously received within the internal cavities 158 and 164 and the outer face 112 may be parallel to respective said first and second primary walls 160 and 166. Referring to FIG. 7, in embodiments of the system 172 wherein the connector assembly 100 is in locking configuration, the actuator elements 130 are applying sufficient pressing force to the web portion 124 to cause compression between the outer walls 112 and 114 and respective primary walls 160 and 166, and opposing resilient rotation 178 of the lobe members about their respective lobe axes 120 and 122. The opposing resilient rotation 178 preferably results in compressive engagement between the outboard edges 128 and respective intermediate walls (162 or 168). In preferred embodiments, the hollow closed-contour cross-section of the lobe members allows the frame connector assembly 100 to provide substantially increased bending inertia to the joint without a corresponding increase in the weight of the frame connector assembly.

When the in-line frame connection system 172 is assembled and the frame connector assembly 100 is in its locking configuration (see FIGS. 5 and 7 for example), the first and second frame members 102 and 104 are restrained from separating from one another along the main axis 106. Moreover, in certain embodiments, one segment 170 of the frame connector assembly 100 may be placed in locking configuration with respect to a first frame member 102 while the other segment 170 remains in slideable unlocked configuration with regard to the second frame member 104. This differential locking configuration is achievable with a connector assembly 100 having at least two actuator elements 130, by virtue of at least one actuator element 130 being threadedly moved to its locking position (as illustrated in FIG. 7 for example) while another of the actuator elements 130 remains in its unlocking position (see FIG. 6 for example). This capability allows the frame connector assembly to be lockingly secured to the respective frame members one at a time. Moreover, in certain embodiments, the first expansion element 108 may preferably be riveted, screwed or otherwise permanently affixed to a respective primary wall 160 of the first frame member 102.

In certain embodiments of the in-line frame connection system 172, the frame connector assembly 100 may be at least 300 mm in length, the actuator 132 distance may be at least 150 mm and the first frame member 102 and second frame member 104 may each have a height and width of 120 mm. The frame members are typically formed of extruded Aluminum, but for the purpose of facilitating illustration herein, they are depicted transparently in FIGS. 4 and 5.

The two-part "floating" design of the frame connector assembly makes it easy to insert it into large frame member extrusion provides during assembly of the frame system. Because the first and second expansion elements are elastically connected to one another, the frame members being joined do not need to be perfectly aligned with one another when they are initially placed together. This greatly enhances the ease of assembly of the overall joint system. Additionally, the fact that the first and second expansion elements can share the same extrusion profile makes the assembly less expensive to manufacture.

Preferred embodiments of the frame connector assembly in accordance with the present invention are fully self-contained, and do not involve loose components which may become lost during framework assembly, disassembly or shipment. Once the frame connector assembly is received within a respective pair of frame members, the actuator elements or "set screws" are quickly and easily tightened by way of a common torqueing tool for example, thereby ensuring reliable, safe securement of a strong in-line joint. Shorter versions of the frame connector assembly may be used to join vertical frame members and short horizontal frame members, while longer versions of the frame connector assembly may be used for long horizontal members and any frame members bearing additional loads.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A frame connector assembly for releasably rigidly joining a first frame member and a second frame member in-line with one another, said assembly comprising:
    a main axis and first and second expansion elements joined to one another laterally thereof in elastically separable fashion, said first expansion element having a first outer face, said second expansion element having a second outer face disposed oppositely of said first outer face, said second expansion element having a pair of hollow lobe members each elongated along a respective lobe axis, said lobe members being connected to one another by way of a web portion therebetween, thereby defining a channel disposed inward of said second outer face, each said lobe member having an outboard edge; and
    at least two actuator elements mounted in threaded association with said first expansion element and separated by an actuator distance along said main axis, each said actuator element having a tool engagement end and a web engagement end, said tool engagement ends being accessible through said first outer face, said web engagement end being pressingly associated with said web portion wherein threaded movement of said actuator elements in an expansion direction toward said second expansion element forces said first and second expansion elements apart from one another.

2. A frame connector assembly as defined in claim 1 wherein said first expansion element has a block mounting groove disposed oppositely of said first outer face, and said actuator elements are mounted in said threaded association by way of respective block elements retained within said block mounting groove.

3. A frame connector assembly as defined in claim 2 wherein said block elements are comprised of a polymer molded with a respective female-threaded brass fitting therein.

4. A frame connector assembly as defined in claim 1 wherein said first and second expansion elements are comprised of Aluminum and have an identical extrusion cross-section.

5. A frame connector assembly as defined in claim 1 whereas said elastic separability is provided by way of one or more spring elements.

6. A frame connector assembly as defined in claim 5 whereas said one or more spring elements are formed of flat spring steel and are riveted to said expansion elements.

7. A frame connector assembly as defined in claim 1 wherein said actuator distance is at least 150 mm.

8. A frame connector assembly as defined in claim 7 wherein said frame connector assembly is at least 300 mm in length.

9. A frame connector assembly as defined in claim 8 wherein said first frame member and second frame member each have a height and width of 120 mm.

10. A frame connector assembly as defined in claim 1 wherein
    said first frame member has a first internal cavity defined by a pair of opposed first primary walls and a pair of opposed first intermediate walls extending therebetween, said second frame member has a second internal cavity defined by a pair of opposed second primary walls and a pair of opposed second intermediate walls extending therebetween;
    said frame connector assembly has a dual-received configuration wherein respective segments of said frame connector assembly are simultaneously slidably received within said internal cavities and said first outer face is parallel to respective said first and second primary walls; and
    when said frame connector assembly is in said dual-received configuration, continued said threaded movement of said actuator elements in said expansion direction results in compression between said outer walls and respective said primary walls, and opposing resilient rotation of said lobe members about their respective lobe axes.

11. A frame connector assembly as defined in claim 10 wherein said opposing resilient rotation is configured to result in compressive engagement between said outboard edges and respective said intermediate walls.

12. A frame connector assembly for releasably rigidly joining a first frame member and a second frame member in-line with one another, said assembly comprising:
- a main axis and first and second expansion elements joined to one another laterally thereof in elastically separable fashion, said first expansion element having a first outer face and a block mounting groove disposed oppositely thereof, said second expansion element having a second outer face disposed oppositely of said first outer face, said second expansion element having a pair of hollow lobe members each elongated along a respective lobe axis, said lobe members being connected to one another by way of a web portion therebetween, thereby defining a channel disposed inward of said second outer face, each said lobe member having an outboard edge;
- at least two block elements retained within said block mounting groove; and
- at least two actuator elements, each said actuator element being mounted in threaded association with said first expansion element by way of a respective said block element, said actuator elements being separated by an actuator distance along said main axis, each said actuator element having a tool engagement end and a web engagement end, said tool engagement ends being accessible through said first outer face, said web engagement end being pressingly associated with said web portion wherein threaded movement of said actuator elements in an expansion direction toward said second expansion element forces said first and second expansion elements apart from one another;
- wherein said first and second expansion elements are comprised of Aluminum and have an identical extrusion cross-section.

13. A frame connector assembly as defined in claim 12 wherein said block elements are comprised of a polymer molded with a respective female-threaded brass fitting therein.

14. A frame connector assembly as defined in claim 12 whereas said elastic separability is provided by way of one or more spring elements formed of flat spring steel and riveted to said expansion elements.

15. A frame connector assembly as defined in claim 12 wherein said frame connector assembly is at least 300 mm in length and said actuator distance is at least 150 mm.

16. An in-line frame connection system in which a frame connector assembly is in releasably rigid joining relationship between a first frame member and a second frame member, said system comprising:
- a main axis and first and second expansion elements joined to one another laterally thereof in elastically separable fashion, said first expansion element having a first outer face, said second expansion element having a second outer face disposed oppositely of said first outer face, said second expansion element having a pair of hollow lobe members each elongated along a respective lobe axis, said lobe members being connected to one another by way of a web portion therebetween, thereby defining a channel disposed inward of said second outer face, each said lobe member having an outboard edge;
- at least two actuator elements mounted in threaded association with said first expansion element and separated by an actuator distance along said main axis, each said actuator element having a tool engagement end and a web engagement end, said tool engagement ends being accessible through said first outer face, said web engagement end being pressingly associated with said web portion wherein threaded movement of said actuator elements in an expansion direction toward said second expansion element forces said first and second expansion elements to spread apart from one another;
- said first frame member being elongated and having a first internal cavity defined by a pair of opposed first primary walls and a pair of opposed first intermediate walls extending therebetween, said second frame member being elongated and having a second internal cavity defined by a pair of opposed second primary walls and a pair of opposed second intermediate walls extending therebetween;
- respective segments of said frame connector assembly being simultaneously received within said internal cavities and said first outer face being parallel to respective said first and second primary walls; and
- said actuator elements applying sufficient pressing force to said web portion to cause compression between said outer walls and respective said primary walls, and opposing resilient rotation of said lobe members about their respective lobe axes, said opposing resilient rotation resulting in compressive engagement between said outboard edges and respective said intermediate walls.

17. An in-line frame connection system as defined in claim 16 wherein said first and second expansion elements are comprised of Aluminum and have an identical extrusion cross-section.

18. An in-line frame connection system as defined in claim 16 wherein said first expansion element has a block mounting groove disposed oppositely of said first outer face, and said actuator elements are mounted in said threaded association by way of respective block elements retained within said block mounting groove, said block elements being comprised of a polymer molded with a respective female-threaded brass fitting therein.

19. An in-line frame connection system as defined in claim 16 wherein said elastic separability is provided by way of one or more spring elements formed of flat spring steel and riveted to said expansion elements.

20. An in-line frame connection system as defined in claim 16 wherein said frame connector assembly is at least 300 mm in length, said actuator distance is at least 150 mm and said first frame member and second frame member each have a height and width of 120 mm.

* * * * *